United States Patent [19]
Suh

[11] Patent Number: 5,946,035
[45] Date of Patent: Aug. 31, 1999

[54] FLASH CONTROL METHOD FOR AN INTERLINE CHARGE COUPLED DEVICE CAMERA

[75] Inventor: Inh-seok Suh, Kyungki-do, Rep. of Korea

[73] Assignee: Samsung Aerospace Industries, Ltd., Kyongsangnam-do, Rep. of Korea

[21] Appl. No.: 08/787,518

[22] Filed: Jan. 22, 1997

[30] Foreign Application Priority Data

Jan. 23, 1996 [KR] Rep. of Korea ..................... 96-1399

[51] Int. Cl.⁶ ................................................ H04N 5/232
[52] U.S. Cl. ......................................... 348/371; 396/155
[58] Field of Search ................................. 348/370, 371, 348/216; 396/155, 159

[56] References Cited

U.S. PATENT DOCUMENTS

| | | | |
|---|---|---|---|
| 4,354,141 | 10/1982 | Takematsu | 315/241 |
| 4,398,127 | 8/1983 | Bahn et al. | 315/151 |
| 4,542,975 | 9/1985 | Ishida et al. | 396/157 |
| 4,615,599 | 10/1986 | Kataoka et al. | 396/157 |
| 4,805,037 | 2/1989 | Noble et al. | 386/119 |
| 4,879,600 | 11/1989 | Ise et al. | 348/20 |
| 4,963,985 | 10/1990 | Isoguchi et al. | 348/348 |
| 5,371,568 | 12/1994 | Takagi et al. | 396/157 |
| 5,559,552 | 9/1996 | Inuiya et al. | 348/220 |
| 5,634,146 | 5/1997 | Goo | 396/61 |
| 5,729,772 | 3/1998 | Sato et al. | 396/159 |

*Primary Examiner*—Wendy Garber
*Assistant Examiner*—Mitchell L. White
*Attorney, Agent, or Firm*—Finnegan, Henderson, Farabow, Garrett & Dunner, L.L.P.

[57] ABSTRACT

A flash control method for an interline charge coupled device (CCD) camera, in which two photographic fields of an object are used to form one frame, is disclosed. The method comprises the step of storing an equation defining the relationship between a light emission amount of a flash, a flash voltage, and a light emission time for the flash. The target light emission amount is then set according to photographic conditions of the object. A first flash voltage is then measured, and a first light emission time is calculated using the stored equation according to the set target light emission amount and the measured first flash voltage. Light is then emitted for a duration corresponding to the calculated first light emission time in sync with a first period of the vertical sync signal. A second flash voltage is then measured, and a second light emission time is calculated using the stored equation according to the set target light emission amount and the measured second flash voltage. Finally, the camera emits light for a duration corresponding to the calculated second light emission time in sync with a second period of the vertical sync signal.

12 Claims, 2 Drawing Sheets

FLASH CONTROL METHOD FOR AN INTERLINE CHARGE COUPLED DEVICE CAMERA

BACKGROUND OF THE INVENTION

A. Field of the Invention

The present invention relates to a method for controlling the flash of a camera. More particularly, the present invention relates to a method for controlling the flash of an interline charge coupled device (CCD) camera.

B. Description of the Prior Art

In general terms, an interline CCD camera is a digital camera using an interlace method. According to this method, the camera takes two photographs of an image and then forms one frame by synthesizing the two photograph fields. Since it usually takes no more than 1/60 of a second to photograph an image, the period for one frame is 1/30 of a second. When the interline CCD camera uses a flash, the flash is normally set to emit light once during a predetermined emitting time for each frame period. However, the maximum duration of a typical flash is about 3 ms, much shorter than a frame period (1/30 second which equals about 33.3 ms). Furthermore, when the flash is used indoors or in a dark place, there will be differences in the amount of light between the two photograph fields. These differences cause lines to be generated in the photograph, thus deteriorating the quality of the final image.

To prevent this problem when the flash is used, only one photograph of an image is used to form a frame. However, this results in lowering the vertical resolution of the photograph as compared to when two photographs are used when there is no flash.

SUMMARY OF THE INVENTION

An important advantage of the present invention is the provision of an arrangement which substantially obviates one or more of the limitations and disadvantages of the described prior art methods. In particular, the present invention is directed to a flash control method for an interline CCD camera in which the amount of light, in each of two fields which form one frame, are controlled to be the same.

Additional features and advantages of the invention will be set forth in the description which follows, and in part will be obvious from the description, or may be learned by practice of the invention. The objectives and other advantages of the invention may be realized and attained by the apparatus particularly pointed out in the written description and claims hereof, as well as the appended drawings.

To achieve these and other advantages and in accordance with the purpose of the invention, as embodied and broadly described, the invention comprises a flash control method for an interline charge coupled device (CCD) camera, in which two photographic fields of an object are used to form one frame. The method comprises the step of storing an equation defining the relationship between a light emission amount of a flash, a flash voltage, and a light emission time for the flash. The target light emission amount is then set according to photographic conditions of the object. A first flash voltage is then measured, and a first light emission time is calculated using the stored equation according to the set target light emission amount and the measured first flash voltage. Light is then emitted for a duration corresponding to the calculated first light emission time in sync with a first period of the vertical sync signal. A second flash voltage is then measured, and a second light emission time is calculated using the stored equation according to the set target light emission amount and the measured second flash voltage. Finally, the camera emits light for a duration corresponding to the calculated second light emission time in sync with a second period of the vertical sync signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DESCRIPTION OF THE INVENTION

Embodiments of the present invention will now be described with reference to the accompanying drawings.

Figure 1:
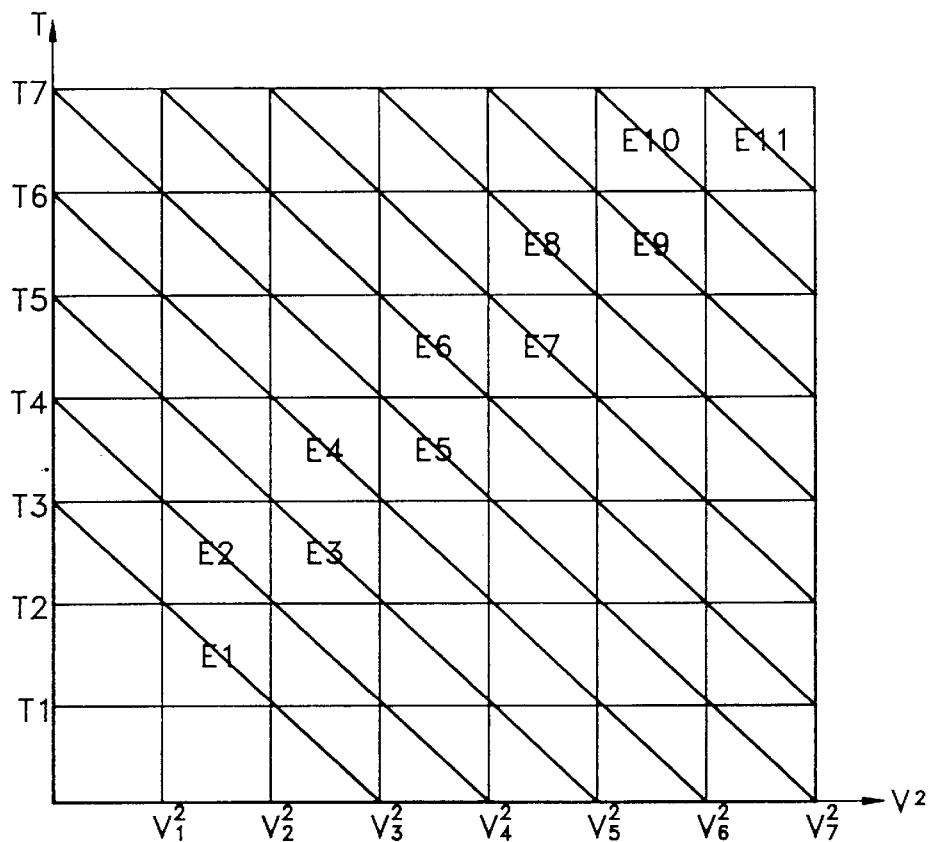
FIG. 1 is a diagram illustrating the amount of emitted light as the flash voltage and light emission time, according to an embodiment of the present invention, are varied.
Figure 2:
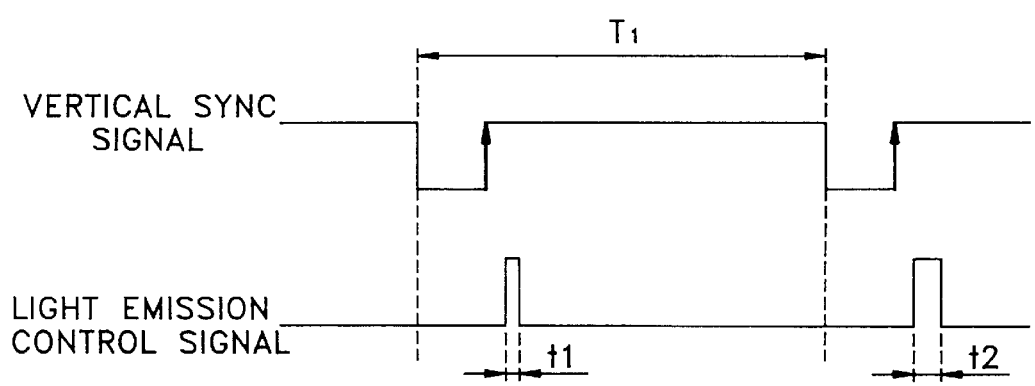
FIG. 2 is a timing diagram of a vertical sync signal and a light emission control signal, according to an embodiment of the present invention.
Figure 3:
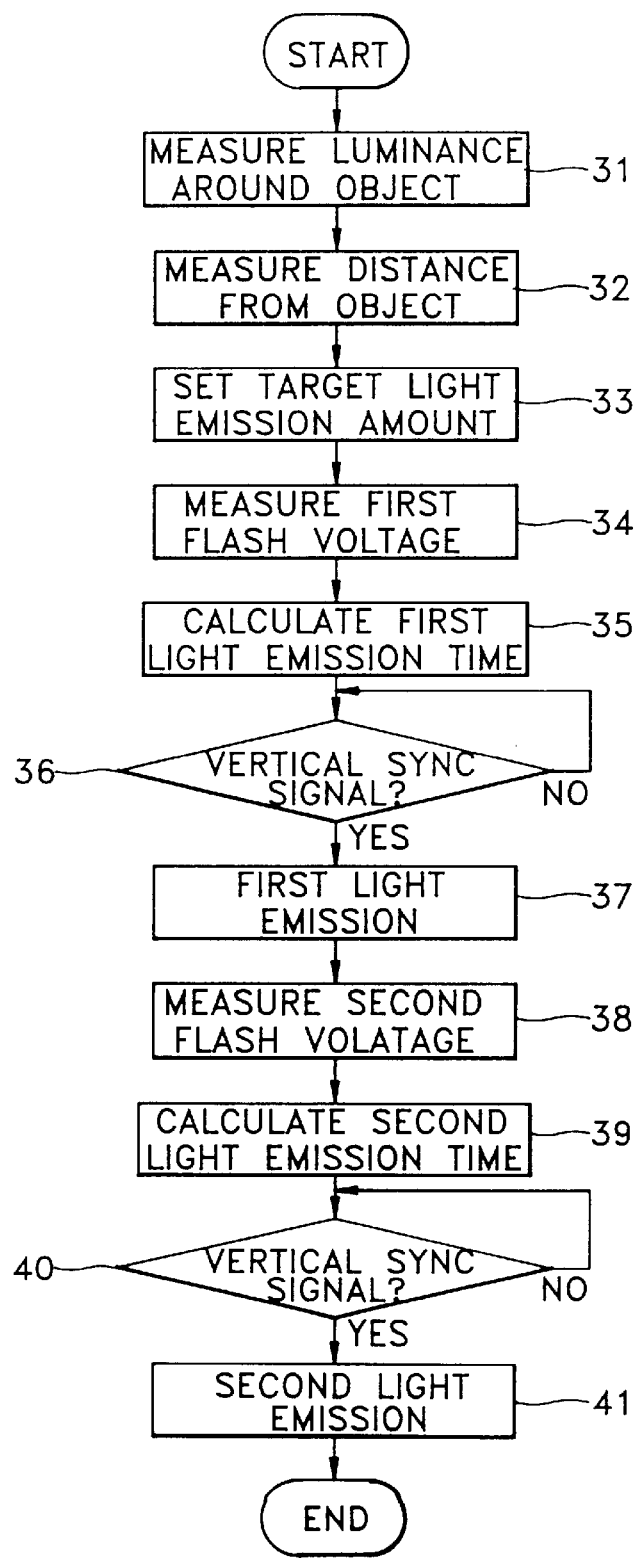
FIG. 3 is a flow chart of the flash control method, according to an embodiment of the present invention.

As illustrated in FIGS. 1 through 3, a first preferred embodiment of a flash control method is provided. Referring to the diagram of FIG. 1, the horizontal axis represents a voltage squared $V^2$, the vertical axis represents the light emission time T, and the values En (n being an integer) represent the amount of emitted light when the flash is discharged with a voltage Vn for a time Tn. The solid lines drawn through each En represent lines of constant light emission amounts. Furthermore, the solid lines are drawn in increasing order of light emission amounts, from the lower-leftmost line to the upper-rightmost line.

The light emission amount E is proportional to the voltage squared $V^2$ and the light emission time T, and can be represented by the equation $E = k \times V^2 \times T$ (where k is either a constant or variable, depending upon the product specifications of the particular flash used). Therefore, this equation can be used as part of a flash control algorithm of an interline CCD camera. For instance, a target light emission amount E may be determined for each photographing point given the light emission time T and the voltage squared $V^2$.

An overview of the flash control process of the present invention will now be briefly described. Once the camera enters a flash mode, the camera measures the distance to an object to be photographed, the light emission amount according to the intensity of illumination surrounding the object, and a first flash voltage amount. A first light emission time is then calculated based upon the measured light emission amount and the measured first flash voltage. In following, the flash emits light for a duration of the first light emission time in sync with the generation of a corresponding period of a vertical sync signal. A second flash voltage is then measured, and a second light emission time is calculated based on the measured light emission amount and the measured second flash voltage. The flash then emits light for a second time in sync with a second period of the vertical sync signal. Accordingly, the first and second light emission amounts can be the same by controlling the emission time of each light through the use of the vertical sync signal.

FIG. 2 is a timing diagram of the above vertical sync signal and a light emission control signal according to an embodiment of the present invention. In FIG. 2, $T_1$ is the period of the vertical sync signal, and is equal to either a half period of a frame, a photography period, or a field period of the interline CCD camera. These values for $T_1$ will typically be equal to 1/60 of a second since the period of one frame is normally 1/30 of a second. Further, t1 and t2 denote the duration of the first and second light emission times, respectively, calculated according to the above equation. Since the flash voltage during the second light emission is lower than that of the first light emission, t2 is longer than t1 as shown in FIG. 2. Therefore, since the camera emits light, at a time controlled by the corresponding periods of the vertical sync signal, the first and second light emission amounts can be the same.

FIG. 3 is a flow chart which illustrates in greater detail the above flash control method, according to an embodiment of the present invention. First, the camera measures the intensity of the illumination from an object to be photographed (step 31) and the distance to the object (steps 32). A target light emission amount is then determined, or set, based upon the measured illumination of the object and the distance to the object (step 33). The camera then measures a first flash voltage (step 34), and calculates a first light emission time from the set target light emission amount and the measured first flash voltage (step 35). For example, if the target light emission amount is set to be E7 (as shown in FIG. 1), then the first light emission time is calculated to be T4 if the measured first flash voltage is $V^2_5$.

When a corresponding vertical sync signal is generated (step 36), the camera emits light for the duration of the first light emission time in synch with the rising edge of the vertical sync signal (step 37). Upon the measurement of the second flash voltage (step 38), the camera then calculates a second light emission time from the set target light emission amount and the measured second flash voltage (step 39). For example, if the target light emission amount has been set to be E7, then the second light emission time is calculated to be T6 if the measured second flash voltage is $V^2_3$. When a corresponding period of the vertical sync signal is generated (step 40), light is emitted for the duration of the second light emission time in sync with the rising edge of the vertical sync signal (step 41). As a result, the first light emission amount and the second light emission amount are the same.

As described above, in the flash control method for an interline CCD camera according to the present invention, the quality of an image when a flash is used can be improved by making the flash light amounts of the two fields of each frame to be the same.

Other embodiments of the invention will be apparent to the skilled in the art from consideration of the specification and practice of the invention disclosed herein. For example, instead of storing the above equation defining the relationship between the light emission amount, the voltage, and the light emission time, the particular data for each different case may be stored directly. Further, if necessary, the target light emission amount, according to the distance to an object, can be stored without measuring the intensity of illumination around the object. It is intended that the specification and examples be considered as exemplary only, with the true scope and spirit of the invention being indicated by the following claims.

What is claimed is:

1. A flash control method for an interline charge coupled device (CCD) camera in which two photographic fields of an object are used to form one frame, comprising the steps of:

(a) storing an equation defining a relationship between a light emission amount of a flash, a flash voltage, and a light emission time for the flash;

(b) setting a target light emission amount according to photographic conditions of the object;

(c) measuring a first flash voltage;

(d) calculating a first light emission time using the stored equation according to the set target light emission amount and the measured first flash voltage;

(e) emitting light for a duration corresponding to the calculated first light emission time in sync with a first period of a vertical sync signal;

(f) measuring a second flash voltage;

(g) calculating a second light emission time using the stored equation according to the set target light emission amount and the measured second flash voltage; and (h) emitting light for a duration corresponding to the calculated second light emission time in sync with a second period of a vertical sync signal.

2. The method of claim 1, wherein the stored equation is $$E = k \times V^2 \times T,$$

where E represents the light emission amount of the flash, $V^2$ represents the flash voltage, T represents the light emission time of the flash, and k represents a constant determined by product specifications of the flash.

3. The method of claim 1, wherein the photographic conditions of the object in step (b) include at least one of distance between the object and said camera and intensity of illumination around the object.

4. A flash control method comprising the steps of:

(a) forming a frame with an interline charge coupled device (CCD) camera using two photographic fields of an object;

(b) storing an equation defining a relationship between a light emission amount of a flash, a flash voltage, and a light emission time for the flash;

(c) setting a target light emission amount according to photographic conditions of the object;

(d) measuring a first flash voltage;

(e) calculating a first light emission time using the stored equation according to the set target light emission amount and the measured first flash voltage;

(f) emitting light for a duration corresponding to the calculated first light emission time in sync with a first period of a vertical sync signal of the CCD camera;

(g) measuring a second flash voltage;

(h) calculating a second light emission time using the stored equation according to the set target light emission amount and the measured second flash voltage; and (i) emitting light for a duration corresponding to the calculated second light emission time in sync with a second period of a vertical sync signal of the CCD camera.

5. The method of claim 4, wherein the stored equation is $$E = k \times V^2 \times T,$$

where E represents the light emission amount of the flash, $V^2$ represents the flash voltage, T represents the light emission time of the flash, and k represents a constant determined by product specifications of the flash.

6. The method of claim 4, wherein the photographic conditions of the object in step (b) include at least one of distance between the object and said camera and intensity of illumination around the object.

7. A flash control method comprising the steps of:
(a) forming a frame with an interline charge coupled device (CCD) camera using an interlace method;
(b) storing an equation defining a relationship between a light emission amount of a flash, a flash voltage, and a light emission time for the flash;
(c) setting a target light emission amount according to photographic conditions of the object;
(d) measuring a first flash voltage;
(e) calculating a first light emission time using the stored equation according to the set target light emission amount and the measured first flash voltage;
(f) emitting light for a duration corresponding to the calculated first light emission time in sync with a first period of a vertical sync signal of the CCD camera;
(g) measuring a second flash voltage;
(h) calculating a second light emission time using the stored equation according to the set target light emission amount and the measured second flash voltage; and
(i) emitting light for a duration corresponding to the calculated second light emission time in sync with a second period of a vertical sync signal of the CCD camera.

8. The method of claim 7, wherein the stored equation is $$E = k \times V^2 \times T,$$

where E represents the light emission amount of the flash, $V^2$ represents the flash voltage, T represents the light emission time of the flash, and k represents a constant determined by product specifications of the flash.

9. The method of claim 7, wherein the photographic conditions of the object in step (b) include at least one of distance between the object and said camera and intensity of illumination around the object.

10. A flash control method for an interline charge coupled device (CCD) camera in which an interlace method is used, comprising the steps of:
(a) storing an equation defining a relationship between a light emission amount of a flash, a flash voltage, and a light emission time for the flash;
(b) setting a target light emission amount according to photographic conditions of the object;
(c) measuring a first flash voltage;
(d) calculating a first light emission time using the stored equation according to the set target light emission amount and the measured first flash voltage;
(e) emitting light for a duration corresponding to the calculated first light emission time in sync with a first period of a vertical sync signal;
(f) measuring a second flash voltage;
(g) calculating a second light emission time using the stored equation according to the set target light emission amount and the measured second flash voltage; and
(h) emitting light for a duration corresponding to the calculated second light emission time in sync with a second period of a vertical sync signal.

11. The method of claim 10, wherein the stored equation is $$E = k \times V^2 \times T,$$

where E represents the light emission amount of the flash, $V^2$ represents the flash voltage, T represents the light emission time of the flash, and k represents a constant determined by product specifications of the flash.

12. The method of claim 10, wherein the photographic conditions of the object in step (b) include at least one of distance between the object and said camera and intensity of illumination around the object.

* * * * *